United States Patent
Ito et al.

(10) Patent No.: US 10,899,212 B2
(45) Date of Patent: Jan. 26, 2021

(54) VEHICLE POWER SUPPLY SYSTEM AND COOLING CIRCUIT

(71) Applicant: HONDA MOTOR CO., LTD., Tokyo (JP)

(72) Inventors: Satoko Ito, Wako (JP); Dajiro Takizawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 387 days.

(21) Appl. No.: 15/551,351

(22) PCT Filed: Dec. 15, 2015

(86) PCT No.: PCT/JP2015/085068
§ 371 (c)(1),
(2) Date: Aug. 16, 2017

(87) PCT Pub. No.: WO2016/132641
PCT Pub. Date: Aug. 25, 2016

(65) Prior Publication Data
US 2018/0015839 A1   Jan. 18, 2018

(30) Foreign Application Priority Data
Feb. 19, 2015 (JP) .................. 2015-030680

(51) Int. Cl.
*H01M 10/613* (2014.01)
*B60K 11/04* (2006.01)
(Continued)

(52) U.S. Cl.
CPC ................ *B60K 1/04* (2013.01); *B60K 11/04* (2013.01); *B60L 11/1874* (2013.01);
(Continued)

(58) Field of Classification Search
CPC ................... H01M 10/6567–10/667
See application file for complete search history.

(56) References Cited

U.S. PATENT DOCUMENTS

2001/0040061 A1  11/2001  Matuda et al.
2008/0295535 A1  12/2008  Robinet et al.
(Continued)

FOREIGN PATENT DOCUMENTS

EP  2 637 248 A1  9/2013
JP  07-073908 A   3/1995
(Continued)

OTHER PUBLICATIONS

International Search Report & Written Opinion dated Jan. 19, 2016 corresponding to International Patent Application No. PCT/JP2015/085068, and partial English translation thereof.
(Continued)

*Primary Examiner* — Stephan J Essex
(74) *Attorney, Agent, or Firm* — Squire Patton Boggs (US) LLP (57) ABSTRACT

A vehicle power supply system includes: a plurality of battery modules; a high-voltage system equipment and a cooling circuit having a plurality of battery module cooling units for cooling the plurality of battery modules, and a high-voltage system equipment cooling unit for cooling the high-voltage system equipment. In the cooling circuit, the plurality of battery module cooling units are disposed in parallel, a branching portion is provided on an upstream side of the plurality of battery module cooling units, a merging portion is provided on a downstream side of the plurality of battery module cooling units, and the high-voltage system equipment cooling unit is provided on a downstream side of the merging portion.

5 Claims, 7 Drawing Sheets

(51) Int. Cl.
    *H01M 10/625* (2014.01)
    *H01M 10/63* (2014.01)
    *H01M 10/6557* (2014.01)
    *B60K 1/04* (2019.01)
    *H01M 10/6568* (2014.01)
    *H01M 10/667* (2014.01)
    *B60L 50/64* (2019.01)
    *B60L 58/26* (2019.01)
    *B60L 11/18* (2006.01)
    *B60K 1/00* (2006.01)

(52) U.S. Cl.
    CPC ............... *B60L 50/64* (2019.02); *B60L 58/26* (2019.02); *H01M 10/613* (2015.04); *H01M 10/625* (2015.04); *H01M 10/63* (2015.04); *H01M 10/6557* (2015.04); *H01M 10/6568* (2015.04); *H01M 10/667* (2015.04); *B60K 2001/005* (2013.01); *B60K 2001/0438* (2013.01); *B60L 2210/10* (2013.01); *H01M 2220/20* (2013.01)

(56) References Cited

U.S. PATENT DOCUMENTS

| | | | |
|---|---|---|---|
| 2013/0030622 A1 | 1/2013 | Park et al. | |
| 2014/0038009 A1* | 2/2014 | Okawa | H01M 10/6569 429/62 |

FOREIGN PATENT DOCUMENTS

| | | |
|---|---|---|
| JP | 2001037009 A | 2/2001 |
| JP | 2005-012890 A | 1/2005 |
| JP | 2005251459 A | 9/2005 |
| JP | 2008-105645 A | 5/2008 |
| JP | 2009-006744 A | 1/2009 |
| JP | 2009-126256 A | 6/2009 |
| JP | 2010-272284 A | 12/2010 |
| JP | 2013-028323 A | 2/2013 |
| JP | 2013-187159 A | 9/2013 |

OTHER PUBLICATIONS

PCT Written Opinion of the International Preliminary Examining Authority dated Mar. 14, 2017 corresponding to International Patent Application No. PCT/JP2015/085068.

PCT Transmittal of IPRP & PCT International Preliminary Report on Patentability dated Jun. 6, 2017 corresponding to International Patent Application No. PCT/JP2015/085068.

Japanese Office Action application No. 2016-562350 dated Mar. 13, 2018.

* cited by examiner

VEHICLE POWER SUPPLY SYSTEM AND COOLING CIRCUIT

TECHNICAL FIELD

The present invention relates to a vehicle power supply system and a cooling circuit that are provided on an electric vehicle or the like.

BACKGROUND ART

There are known vehicle power supply systems which include a battery and high-voltage system equipment and in which the battery and the high-voltage system equipment are cooled by a single cooling circuit (for example, refer to Patent Literatures 1 to 3). In these vehicle power supply systems, a cooling circuit described in Patent Literature 2 has a configuration in which two high-voltage system equipment cooling portions for cooling a DC-DC converter and a charger, which constitute high-voltage system equipment, and a battery cooling portion for cooling a battery are all connected in series and the battery cooling portion is disposed on a downstream side of the two high-voltage system equipment cooling portions. Additionally, a cooling circuit described in Patent Literature 3 has a configuration in which two high-voltage system equipment cooling portions for cooling an inverter and a motor, which constitute high-voltage system equipment, and a battery cooling portion for cooling a battery module made up of four batteries are all connected in series and the battery cooling portion is disposed on a downstream side of the two high-voltage system equipment cooling portion.

PRIOR ART LITERATURE

Patent Literature

Patent Literature 1: JP-A-2005-12890
Patent Literature 2: JP-A-2010-272284
Patent Literature 3: JP-A-7-73908

SUMMARY OF THE INVENTION

Problem that the Invention is to Solve

However, since the control temperature of a battery is generally lower than the control temperature of high-voltage system equipment, the battery needs to be cooled in preference to the high-voltage system equipment. However, in the cooling circuits described in Patent Literatures 2, 3, since the battery cooling circuit is disposed on the downstream side of the high-voltage system equipment cooling systems, there may be a case where the high-voltage battery cannot be cooled properly due to the influence imposed thereon by the high-voltage system equipment.

In the case of a plurality of battery modules being cooled, in case a plurality of battery module cooling portions for cooling the plurality of battery modules are connected in series, there are fears that a difference in temperature between a battery module situated on an upstream side and a battery module situated on a downstream side becomes great. Additionally, a great pressure loss is generated, which hence requires a cooling pump to provide a high delivery capacity.

The invention provides a vehicle power supply system and a cooling circuit which can reduce the occurrence of a pressure loss to thereby suppress a delivery capacity that a cooling pump should provide to a lower level while cooling a battery and high-voltage system equipment in an ensured fashion even by cooling the battery and the high-voltage system equipment using a single cooling circuit.

Means for Solving the Problem

The invention provides the following aspects. According to a first aspect, there is provided a vehicle power supply system (e.g., a vehicle power supply system 1 in embodiment) including:

a plurality of battery modules (e.g., battery modules 31 to 33 in embodiment), each having a plurality of batteries (e.g., high-voltage batteries 31a to 33a in embodiment);

a high-voltage system equipment (e.g., a DC-DC converter 22, a charger 21 in embodiment); and a cooling circuit (e.g., a cooling circuit 100 in embodiment) having a plurality of battery module cooling units (e.g., battery module cooling units 131 to 133 in embodiment) for cooling the plurality of battery modules, and a high-voltage system equipment cooling unit (e.g., a high-voltage system equipment cooling unit 120 in embodiment) for cooling the high-voltage system equipment, wherein:

in the cooling circuit, the plurality of battery module cooling units are disposed in parallel;

a branching portion (e.g., a branching portion 108 in embodiment) is provided on an upstream side of the plurality of battery module cooling units;

a merging portion (e.g., a merging portion 109 in embodiment) is provided on a downstream side of the plurality of battery module cooling units; and the high-voltage system equipment cooling unit is provided on a downstream side of the merging portion.

According to a second aspect, in the vehicle power supply system according to the first aspect, the high-voltage system equipment has a DC-DC converter (e.g., the DC-DC converter 22 in embodiment) and a charger (e.g., the charger 21 in embodiment), the high-voltage system equipment cooling unit has a DC-DC converter cooling unit (e.g., a DC-DC converter cooling unit 122 in embodiment) for cooling the DC-DC converter and a charger cooling unit (e.g., a charger cooling unit 121 in embodiment) for cooling the charger, and the DC-DC converter cooling unit and the charger cooling unit are disposed in parallel on the downstream side of the merging portion.

According to a third aspect, in the vehicle power supply system according to the second aspect, the cooling circuit has a flow rate control device (e.g., an orifice 107 in embodiment) which is disposed on an upstream side or on a downstream side of the DC-DC converter cooling unit.

According to an fourth aspect, in the vehicle power supply system according to the first to third aspects, the cooling circuit has:

a bypass flow path (e.g., a bypass flow path 105 in embodiment) which connects the upstream side of the plurality of battery module cooling units to a portion that is positioned on an upstream side of the high-voltage system equipment cooling unit and that is positioned on the downstream side of the plurality of battery module cooling units; and a flow path selector (e.g., a three-way solenoid valve 106 in embodiment) which is provided on the upstream side of the plurality of battery module cooling units.

According to a fifth aspect, in the vehicle power supply system according to the fourth aspect, the flow path selector is a solenoid valve (e.g., the three-way solenoid valve 106 in embodiment).

According to a sixth aspect, in the vehicle power supply system according to the fourth or fifth aspect, the flow path selector is a three-way solenoid valve (e.g., the three-way solenoid valve 106 in embodiment) which is provided at a branching portion where the bypass flow path branches off from a flow path on the upstream side of the plurality of battery module cooling units.

According to a seventh aspect, there is provided a cooling circuit (e.g., the cooling circuit 100 in embodiment) including:

a radiator (e.g., a radiator 101 in embodiment);

a cooling pump (e.g., a cooling pump 102 in embodiment);

a plurality of battery module cooling units (e.g., the battery module cooling units 131 to 133 in embodiment) for cooling a plurality of battery modules; and a high-voltage system equipment cooling unit (e.g., the high-voltage system equipment cooling unit 120 in embodiment) for cooling a high-voltage system equipment, wherein:

the plurality of battery module cooling units are disposed in parallel;

a branching portion (e.g., the branching portion 108 in embodiment) is provided on an upstream side of the plurality of battery module cooling units;

a merging portion (e.g., the merging portion 109 in embodiment) is provided on a downstream side of the plurality of battery module cooling units; and the high-voltage system equipment cooling unit is provided on a downstream side of the merging portion.

According to an eighth aspect, in the cooling circuit according to the seventh aspect, the high-voltage system equipment cooling unit has a DC-DC converter cooling unit (e.g., the DC-DC converter cooling unit 122 in embodiment) for cooling a DC-DC converter (e.g., the DC-DC converter 22 in embodiment) and a charger cooling unit (e.g., the charger cooling unit 121 in embodiment) for cooling a charger (e.g., the charger 21 in embodiment), and the DC-DC converter cooling unit and the charger cooling unit are disposed in parallel on the downstream side of the merging portion.

According to a ninth aspect, in the cooling circuit according to the eighth aspect, the cooling circuit has a flow rate control device (e.g., the orifice 107 in embodiment) which is disposed on an upstream side or a downstream side of the DC-DC converter cooling unit.

According to a tenth aspect, in the cooling circuit according to the seventh to ninth aspects, the cooling circuit has:

a bypass flow path (e.g., the bypass flow path 105 in embodiment) which connects the upstream side of the plurality of battery module cooling units to a portion that is positioned on an upstream side of the high-voltage system equipment cooling unit and that is positioned on the downstream side of the plurality of battery module cooling units; and a flow path selector (e.g., the three-way solenoid valve 106 in embodiment) which is provided on the upstream side of the plurality of battery module cooling units.

According to an eleventh aspect, in the cooling circuit according to the tenth aspect, the flow path selector is a solenoid valve (e.g., the three-way solenoid valve 106 in embodiment).

According to a twelfth aspect, in the cooling circuit according to the tenth or eleventh aspect, the flow path selector is a three-way solenoid valve (e.g., the three-way solenoid valve 106 in embodiment) which is provided at a branching portion where the bypass flow path branches off from a flow path on the upstream side of the plurality of battery module cooling units.

Advantages of the Invention

According to the first and seventh aspects, since the battery module cooling units are disposed on the upstream side of the high-voltage system equipment cooling unit, even in such a situation that both the batteries and the high-voltage system equipment are cooled, the batteries whose control temperature is lower (or which are less heat-resistant) can be cooled in an ensured fashion without being influenced by the temperature of the high-voltage system equipment. In addition, since the plurality of battery module cooling units are connected in parallel, it is possible to reduce the difference in temperature between the battery module positioned on the upstream side and the battery module positioned on the downstream side. Further, since the increase in pressure loss can be suppressed, a small and light cooling pump can be used.

According to the second and eighth aspects, since the DC-DC converter cooling unit and the charger cooling unit, which constitute the high-voltage system equipment cooling unit, are disposed in parallel, the pressure loss can be reduced compared with a case where the DC-DC converter cooling unit and the charger cooling unit are disposed in series. In addition, even in the event that the DC-DC converter cooling unit and the charger cooling unit have different refrigerant flow rate requirements, since the refrigerant matching their refrigerant flow rate requirements can be supplied to the DC-DC and charger cooling units, respectively, without any waste, the increase in delivery capacity that the cooling pump should provide can be suppressed.

According to the third and ninth aspects, since the cooling circuit has the flow rate control device which is provided on an upstream side or on a downstream side of the DC-DC converter cooling unit, the flow rate of refrigerant to be supplied to the DC-DC converter cooling unit can be controlled highly accurately, so that all the remaining refrigerant can be supplied to the charger cooling unit whose refrigerant flow rate requirement is greater, thereby making it possible to cool the charger in an ensured fashion.

According to the fourth and tenth aspects, since the cooling circuit has the bypass flow path which bypasses the battery module cooling units and the flow path selector which switches the flow paths, the supply of refrigerant to the battery module cooling units can be cut off selectively using the simple circuit configuration.

According to the fifth and eleventh aspects, since the flow path selector is made up of the solenoid valve, the temperature of the batteries can be controlled appropriately based on a flow path selecting control corresponding to a request from the batteries.

According to the sixth and twelfth aspects, the flow path selector is made up of the three-way solenoid valve which is provided at the branching portion where the bypass flow path branches off from the flow path on the upstream side of the battery module cooling units, it is possible to switch between a state where a whole amount of refrigerant is supplied to the battery module cooling units and the high-voltage system equipment cooling unit and a state where all the refrigerant is supplied only to the high-voltage system equipment cooling unit by switching the three-way solenoid valve as required.

MODE FOR CARRYING OUT THE INVENTION

Hereinafter, an embodiment of a vehicle power supply system of the invention will be described based on the accompanying drawings. The drawings should be seen in a direction in which given reference numerals look normal.

[Vehicle Power Supply System]

Figure 1:
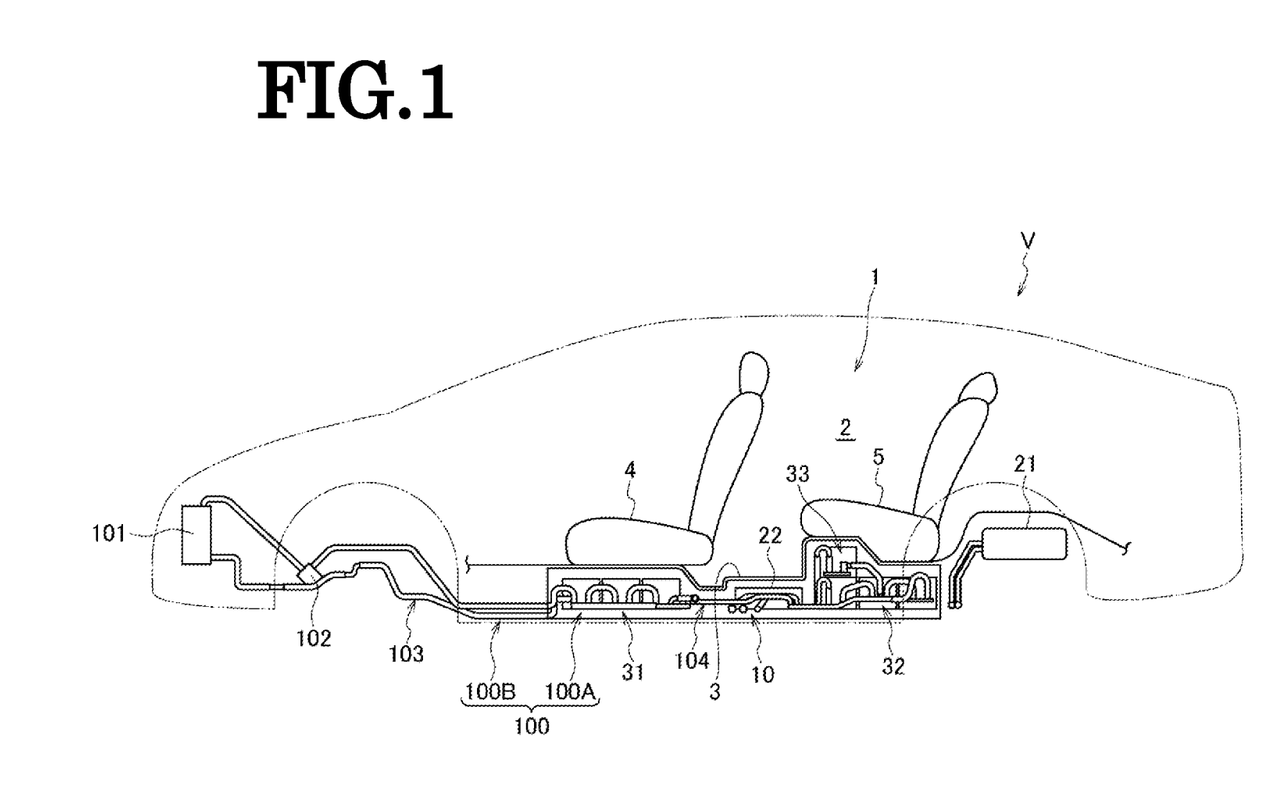
FIG. 1 is a schematic side view of a vehicle on which a vehicle power supply system according to an embodiment of the invention is mounted.

As shown in FIG. 1, a vehicle power supply system 1 according to an embodiment of the invention includes mainly a plurality of battery modules 31 to 33, a DC-DC converter 22, a charger 21, and a cooling circuit 100 for cooling these constituent parts and is mounted on a vehicle V such as a hybrid electric vehicle, an electric vehicle and a fuel cell vehicle. The plurality of battery modules 31 to 33, the DC-DC converter 22, and part of the cooling circuit 100 are unitized to make up a battery unit 10 and are disposed underneath a floor panel 3 which makes up a floor surface of a passenger compartment 2. A radiator 101 and a cooling pump 102, which make up the cooling circuit 100, are disposed at a front portion of the vehicle V and the charger 21, which charges the battery modules 31 to 33 using electric power supplied from an exterior power supply, is disposed at a back portion of the vehicle V in such a way as to hold the battery unit 10 therebetween. The cooling circuit 100 has an interior cooling circuit 100A which is disposed inside the battery unit 10 and an exterior cooling circuit 100B which is disposed outside the battery unit 10.

[Battery Unit]

Figure 2:
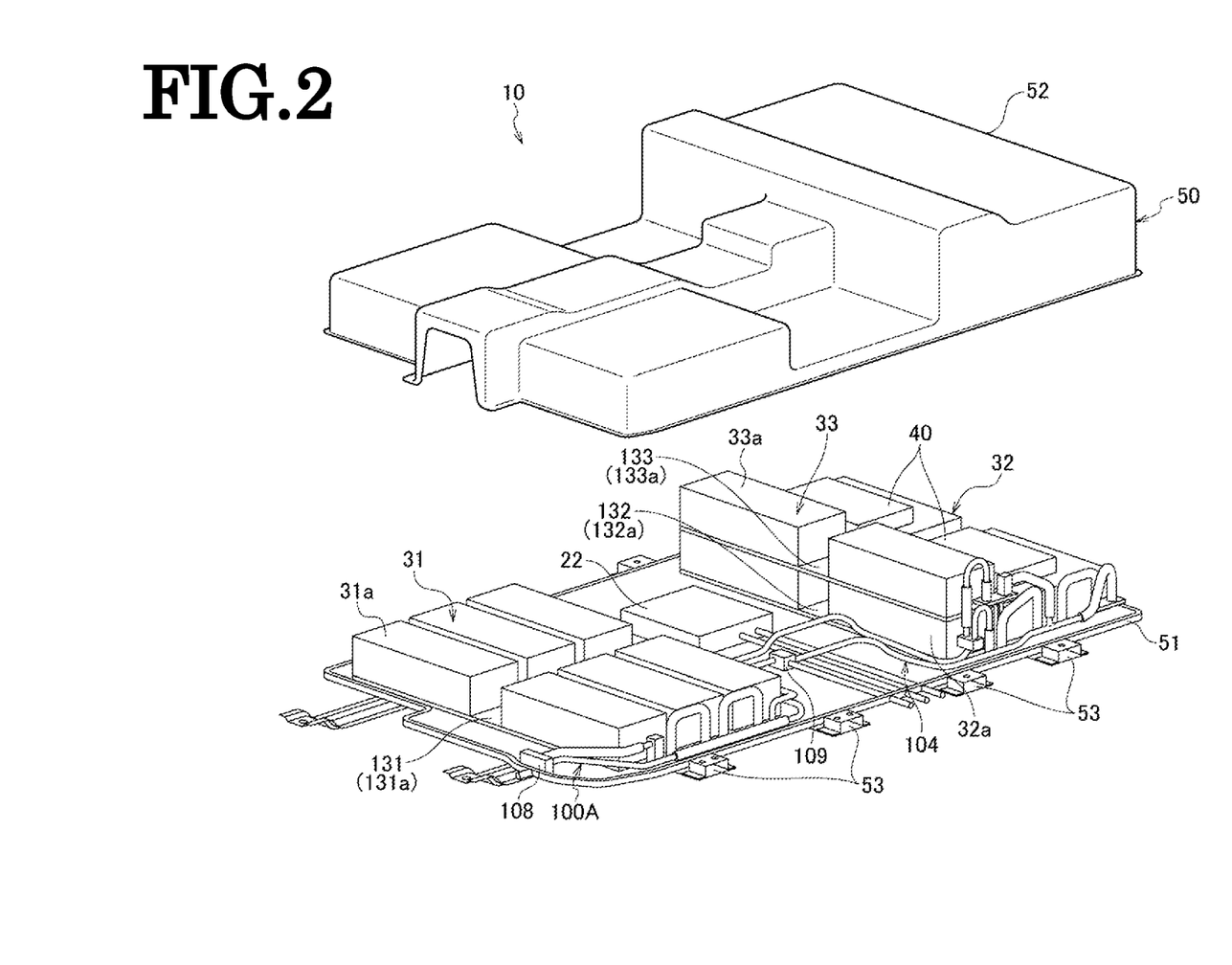
FIG. 2 is an exploded perspective view showing battery units of the vehicle power supply system according to the embodiment of the invention.
Figure 3:
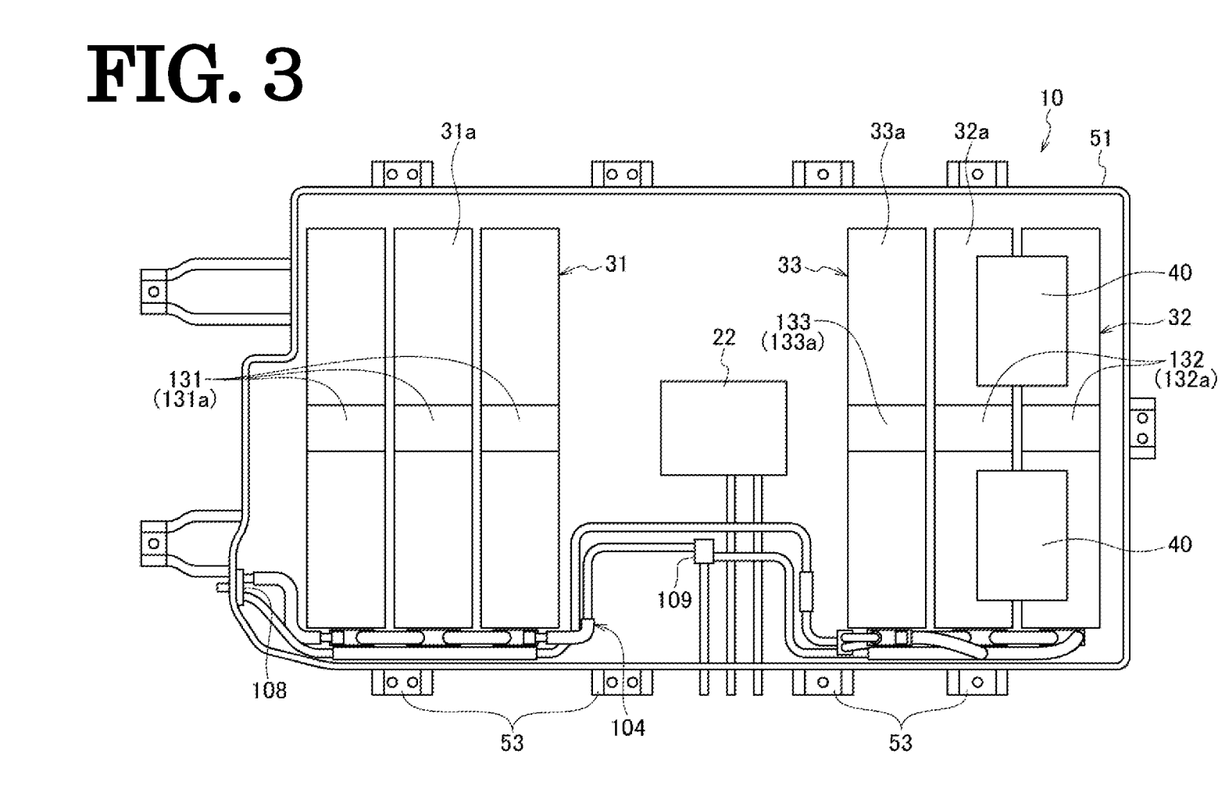
FIG. 3 is an interior plan view showing the battery units of the vehicle power supply system according to the embodiment of the invention.

As shown in FIGS. 2 and 3, the battery unit 10 includes the plurality of battery modules 31 to 33, the DC-DC converter 22, battery ECUs 40, the interior cooling circuit 100A and a case 50 which accommodates these constituent parts.

The case 50 is made up of a bottom plate 51 on which the plurality of battery modules 31 to 33, the DC-DC converter 22, the battery ECUs 40, and the interior cooling circuit 100A are mounted, and a cover 52 which covers those constituent parts from above. A plurality of brackets 53 which run transversely underneath the bottom plate 51 are fastened to floor frames (not shown) which are provided transversely inwards of side sills which are provided on both sides of the vehicle V so as to be parallel to the corresponding side sills, whereby the battery unit 10 is attached to the vehicle V in such a way as to be suspended below the floor panel 3.

The plurality of battery modules 31 to 33 include a front battery module 31 which is accommodated in a front portion of the case 50 and two rear battery modules 32, 33 which are accommodated in a back portion of the case 50, and the battery modules 31 to 33 each have a plurality of high-voltage batteries 31a to 33a. In this embodiment, the front battery module 31 is made up of a total of six high-voltage batteries 31a which are arranged into three rows, aligned side by side in a front-rear direction, of two high-voltage batteries which are aligned end to end in a left-right direction. One of the rear battery modules, that is, the rear battery module 32 (hereinafter, also, referred to as a "lower rear battery module 32") is made up of a total of six high-voltage batteries 32a which are similarly arranged into three rows, aligned side by side in the front-rear direction, of two high-voltage batteries which are aligned end to end in the left-right direction. Additionally, the other of the rear battery modules, that is, the rear battery module 33 (hereinafter, also, referred to as an "upper rear battery module 33") is made up of a single row of two high-voltage batteries 33a which are aligned end to end arranged in the left-right direction.

The plurality of battery modules 31 to 33 are disposed underneath front seats 4 and a rear seat 5 of the vehicle V (refer to FIG. 1). Specifically, the front battery module 31 is disposed underneath the front seats 4, and the lower rear battery module 32 and the upper rear battery module 33 are disposed underneath the rear seat 5.

In disposing the front battery module 31 underneath the front seats 4, the high-voltage batteries 31a are laid out flat without being superposed. In disposing the lower rear battery module 32 and the upper rear battery module 33 underneath the rear seat 5, the lower rear battery module 32 and the upper rear battery module 33 are superposed vertically one on the other underneath a front portion of a seat cushion of the rear seat 5. Specifically, the two high-voltage batteries 33a which make up the upper rear battery module 33 are disposed above the two high-voltage batteries 32a, arranged to constitute a frontmost row, in the six high-voltage batteries 32a which make up the lower rear battery module 32.

The DC-DC converter 22 is the high-voltage system equipment which transforms the voltage of a direct current and is disposed between the front battery module 31 and the rear battery modules 32, 33 and at a transverse center of the battery unit 10. The battery ECUs 40 are battery controllers which control the charging and discharging of the high-voltage batteries 31a to 33a, as well as temperatures thereof and are disposed behind the upper rear battery module 33 and above the lower rear battery module 32.

The DC-DC converter 22 and the charger 21 are more heat-resistant than the high-voltage batteries 31a to 33a, and their control temperatures are set higher than those of the high-voltage batteries 31a to 33a. For example, assuming that an upper limit temperature of the high-voltage batteries 31a to 33a is 60° C., upper limit temperatures of the DC-DC converter 22 and the charger 21 are set at 80° C., and hence, under a high-temperature environment, the high-voltage batteries 31a to 33a need to be cooled in preference to the DC-DC converter 22 and the charger 21. On the other hand, since the charger 21 is heated to high temperatures when it is charged, there may be a situation in which even though the high-voltage batteries 31a to 33a do not have to be cooled, only the DC-DC converter 22 and the charger 21 are desired to be cooled.

The interior cooling circuit 100A will be described below together with the exterior cooling circuit 100B.

[Configuration of Cooling Circuit]

Figure 4:
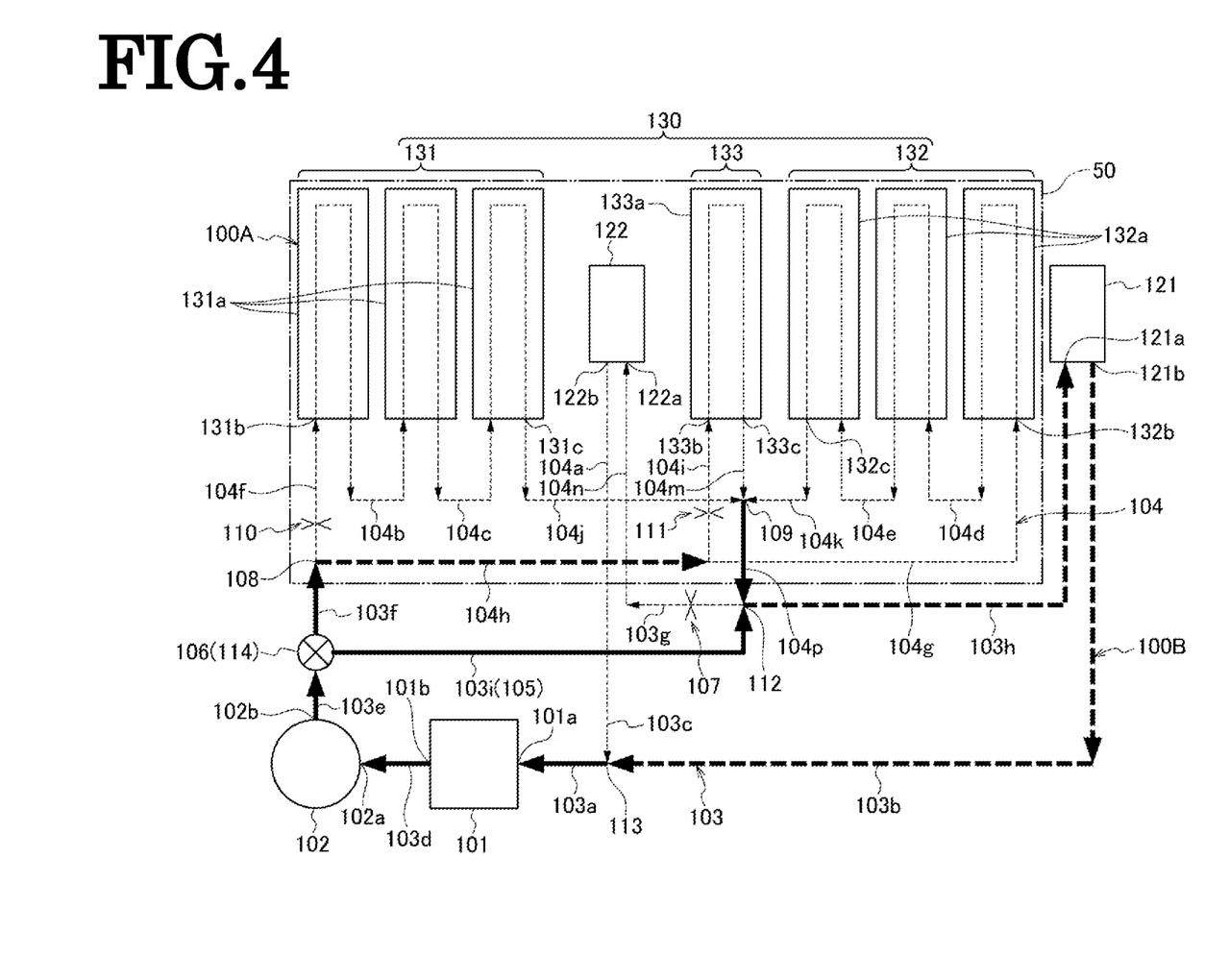
FIG. 4 is a circuit diagram showing the configuration of a cooling circuit of the vehicle power supply system according to the embodiment of the invention.

As shown in FIG. 4, in the cooling circuit 100, the radiator 101, the cooling pump 102, a high-voltage battery cooling unit 130, a DC-DC converter cooling unit 122, and a charger cooling unit 121 are connected together by an external piping 103 which is laid out outside the battery unit 10 and an internal piping 104 which is laid out inside the battery unit 10 to thereby form a refrigerant circulation path.

The radiator 101 radiates heat of a refrigerant which flows thereinto from an inlet port 101a and discharges the refrigerant which is cooled as a result of the heat thereof being radiated therefrom from an outlet port 101b. The inlet port 101a of the radiator 101 is connected to an outlet port 121b of the charger cooling unit 121 by way of a first external piping 103a and a second external piping 103b and is connected to an outlet port 122b of the DC-DC converter cooling unit 122 by way of the first external piping 103a, a third external piping 103c and a first internal piping 104a. The outlet port 101b of the radiator 101 is connected to a suction port 102a of the cooling pump 102 by way of a fourth external piping 103d.

As an electric motor (not shown) is started to be driven, the cooling pump 102 sucks in the refrigerant from the suction port 102a and discharges it from a discharge port 102b. The discharge port 102b of the cooling pump 102 is connected to a branching portion 108, which constitutes an inlet port of the high-voltage battery cooling unit 130, by way of a fifth external piping 103e and a sixth external piping 103f.

The high-voltage battery cooling unit 130 has a plurality of battery module cooling units 131 to 133 for cooling the plurality of battery modules 31 to 33, respectively. A front battery module cooling unit 131 for cooling the front battery module 31 has three cooling jackets 131a which are aligned side by side in the front-rear direction for cooling individually the three pairs of high-voltage batteries 31a which are aligned end to end in the left-right direction, and these cooling jackets 131a are connected in series by way of a second internal piping 104b and a third internal piping 104c. A lower rear battery module cooling unit 132 for cooling the lower rear battery module 32 has three cooling jackets 132a which are aligned side by side in the front-rear direction for cooling individually the three pairs of high-voltage batteries 32a which are aligned end to end in the left-right direction, and these cooling jackets 132a are connected in series by way of a fourth internal piping 104d and a fifth internal piping 104e. An upper rear battery module cooling unit 133 for cooling the upper rear battery module 33 has a single cooling jacket 133a for cooling the pair of high-voltage batteries 33a which are aligned end to end in the left-right direction.

In the high-voltage battery cooling unit 130, the plurality of battery module cooling units 131 to 133 are arranged in parallel. Specifically, an inlet port 131b of the front battery module cooling unit 131 is connected to the branching portion 108 by way of a six internal piping 104f, an inlet port 132b of the lower rear battery module cooling unit 132 is connected to the branching portion 108 by way of a seventh internal piping 104g and an eighth internal piping 104h, and an inlet port 133b of the upper rear battery module cooling unit 133 is connected to the branch portioning 108 by way of a ninth internal piping 104i and the eighth internal piping 104h. An outlet port 131c of the front battery module cooling unit 131 is connected to a merging portion 109 by way of a tenth internal piping 104j, an outlet port 132c of the lower rear battery module cooling unit 132 is connected to the merging portion 109 by way of an eleventh internal piping 104k, and an outlet port 133c of the upper rear battery module cooling unit 133 is connected to the merging portion 109 by way of a twelfth internal piping 104m.

Then, in the battery unit 10, in arranging the plurality of battery module cooling units 131 to 133 in parallel, the branching portion 108 which is provided on an upstream side of the plurality of battery module cooling units 131 to 133 and the merging portion 109 which is provided on a downstream side of the plurality of battery module cooling units 131 to 133 are both provided inside the case 50.

In the high-voltage battery cooling unit 130, in arranging the plurality of battery module cooling units 131 to 133 in parallel, orifices 110, 111, which function as flow rate control devices, are provided on the upstream side (or on the downstream side) of the battery module cooling units 131 to 133 for cooling the battery modules 31 to 33 having a small battery capacity in the plurality of battery modules 31 to 33 and on a downstream side of the branching portion 108.

For example, since the front battery module 31 has a battery capacity which is smaller than a total battery capacity of the two rear battery modules, that is, the lower rear battery module 32 and the upper rear battery module 33, the orifice 110 as the flow rate control device is provided on an upstream side of the front battery module cooling unit 131 for cooling the front battery module 31 (along the sixth internal piping 104f). In addition, since the upper rear battery module 33 has a battery capacity which is smaller than a battery capacity of the lower rear battery module 32, the orifice 111 as the flow rate control device is provided on an upstream side of the upper rear battery module cooling unit 133 for cooling the upper rear battery module 33 (along the ninth internal piping 104i).

The DC-DC converter cooling unit 122 is a cooling jacket which is incorporated in the DC-DC converter 22 or a cooling jacket which is disposed adjacent to the DC-DC converter 22, and the charger cooling unit 121 is a cooling jacket incorporated in the charger 21 or a cooling jacket which is disposed adjacent to the charger 21. Then, the DC-DC converter cooling unit 122 and the charger cooling unit 121 are connected in parallel to each other and are disposed on a downstream side of side the high-voltage battery cooling unit 130.

Specifically, an inlet port 122a of the DC-DC converter cooling unit 122 is connected to a branching portion 112 by way of a thirteenth internal piping 104n and a seventh external piping 103g, and an inlet port 121a of the charger cooling unit 121 is connected to the branch portion 112 by way of an eighth external piping 103h. In addition, an outlet port 122b of the DC-DC converter cooling unit 122 is connected to a merging portion 113 by way of the first internal piping 104a and the third external piping 103c, and an outlet port 121b of the charger cooling unit 121 is connected to the merging portion 113 by way of the second external piping 103b. Then, the branching portion 112 is connected to the merging portion 109 with the high-voltage battery cooling unit 130 by way of a fourteenth internal piping 104p, and the merging portion 113 is connected to the inlet port 101a of the radiator 101 by way of the first external piping 103a.

In the cooling circuit 100, in connecting the DC-DC converter cooling unit 122 and the charger cooling unit 121 in parallel, an orifice 107, which functions as a flow rate control device, is provided on an upstream side (or a downstream side) of the DC-DC converter cooling unit 122 which has a smaller flow rate requirement than that of the charger cooling unit 121. Specifically, the orifice 107 is provided on the seventh external piping 103g to limit the flow rate of refrigerant which flows into the DC-DC converter cooling unit 122, so that the remaining refrigerant is supplied to the charger cooling unit 121. In general, a charger has a greater heat value than that of a DC-DC converter, and therefor, the flow rate of refrigerant for cooling the charger 21 is set greater than the flow rate of refrigerant for cooling the DC-DC converter 22, so that the charger 21 is cooled positively.

Further, in the cooling circuit 100, a bypass flow path 105 is provided which connects an upstream side of the high-voltage battery cooling unit 130 to a portion that is positioned on the upstream side of the high-voltage system equipment cooling unit 120 (the DC-DC converter cooling unit 122 and the charger cooling unit 121) and that is positioned on the downstream side of the high-voltage battery cooling unit 130. Specifically, a connecting portion between the fifth external piping 103e and the sixth external piping 103f is referred to as a branching portion 114, and the branching portion 114 is connected to the branching portion 112 of the high-voltage system equipment cooling unit 120 by way of a ninth external piping 103i which makes up the bypass flow path 105. Then, a three-way solenoid valve 106, which functions as a flow path selector, is provided at the branching portion 114.

When the three-way solenoid valve 106 is off, the fifth external piping 103e and the sixth external piping 103f are connected, whereby refrigerant discharged from the cooling pump 102 is supplied to the high-voltage battery cooling unit 130, while the fifth external piping 103e is disconnected from the bypass flow path 105 (the ninth external piping 103i), whereby the supply of refrigerant to the DC-DC converter cooling unit 122 and the charger cooling unit 121 is cut off. On the other hand, when the three-way solenoid valve 106 is on, the fifth external piping 103e and the bypass flow path 105 (the ninth external piping 103i) are connected, whereby refrigerant discharged from the cooling pump 102 is supplied to the DC-DC converter cooling unit 122 and the charger cooling unit 121, while the fifth external piping 103e is disconnected from the sixth external piping 103f, whereby the supply of refrigerant to the high-voltage battery cooling unit 130 is cut off. In FIG. 4, arrows denote flows of refrigerant, and there is no such situation that both the sixth external piping 103f and the bypass flow path 105 (the ninth external piping 103i) are connected to the fifth external piping 103e.

Figure 5:
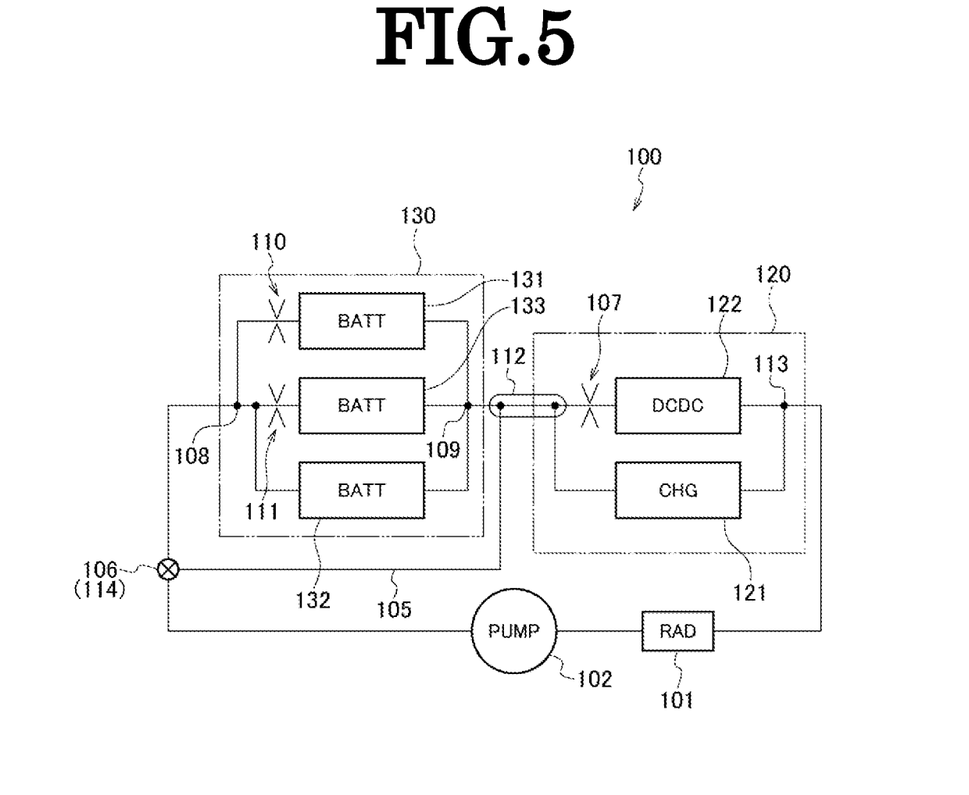
FIG. 5 is a schematic block diagram of the cooling circuit of the vehicle power supply system according to the embodiment of the invention.

FIG. 5 is a schematic block diagram of the cooling circuit 100 which has been described in detail by using FIG. 4. In the figure, a reference sign CHG denotes the charger cooling unit 121, a reference sign DCDC denotes the DC-DC converter cooling unit 122, and reference signs BATT denote the battery module cooling units 131 to 133 (this will be true with FIGS. 6 to 9, which will be described below).

As shown in FIG. 5, in the cooling circuit 100 of this embodiment, the radiator 101, the cooling pump 102, the high-voltage battery cooling unit 130, and the high-voltage system equipment cooling unit 120 which is made up of the charger cooling unit 121 and the DC-DC cooling unit 122 are connected in series, and the high-voltage system equipment cooling unit 120 is disposed on the downstream side of the high-voltage battery cooling unit 130. Additionally, the upstream side of the high-voltage battery cooling unit 130 is connected to a portion that is positioned on the upstream side of the high-voltage system equipment cooling unit 120 and that is positioned on the downstream side of the high-voltage battery cooling unit 130 by the bypass flow path 105, and the three-way solenoid valve 106 is provided at the branching portion 114 where the bypass flow path 105 branches off from a flow path situated on the upstream side of the high-voltage battery cooling unit 130. Further, the high-voltage battery cooling unit 130 is made up of the three battery module cooling units 131 to 133 which are disposed in parallel, and the high-voltage system equipment cooling unit 120 is made up of the DC-DC converter cooling unit 122 and the charger cooling unit 121 which are disposed in parallel.

[Operation of Cooling Circuit]

Figure 6:
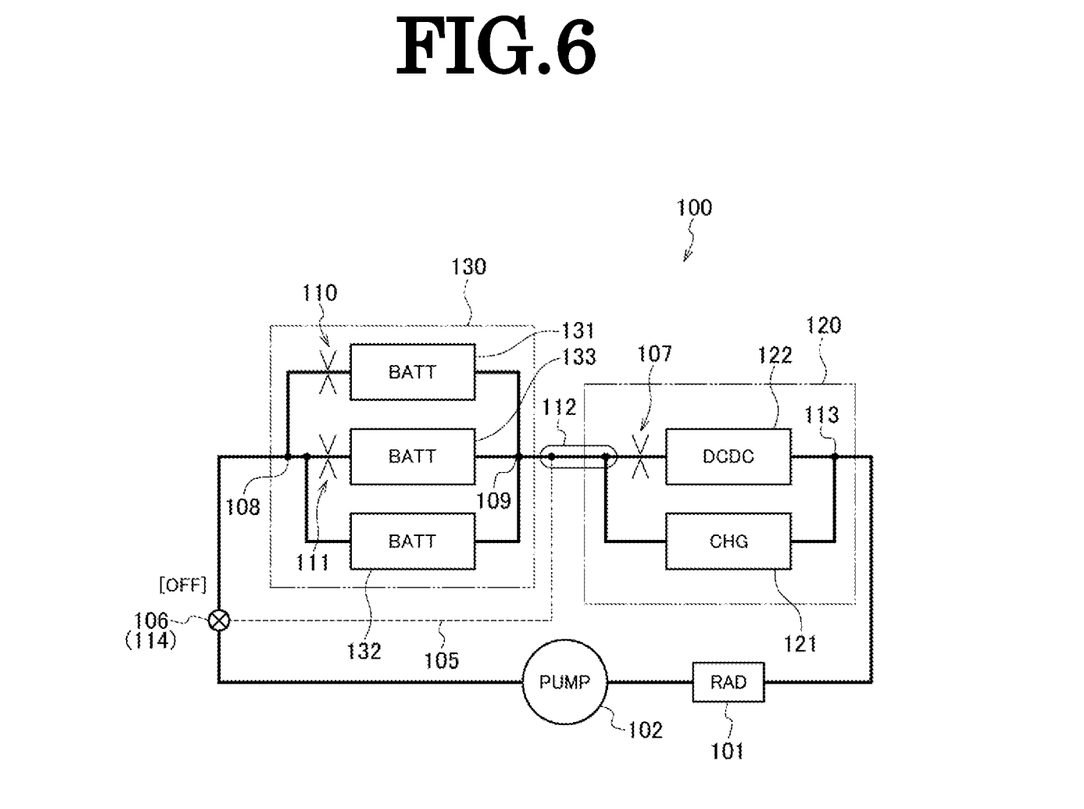
FIG. 6 is a schematic block diagram showing a flow of a refrigerant when a three-way solenoid valve is off in the cooling circuit shown in FIG. 5.
Figure 7:
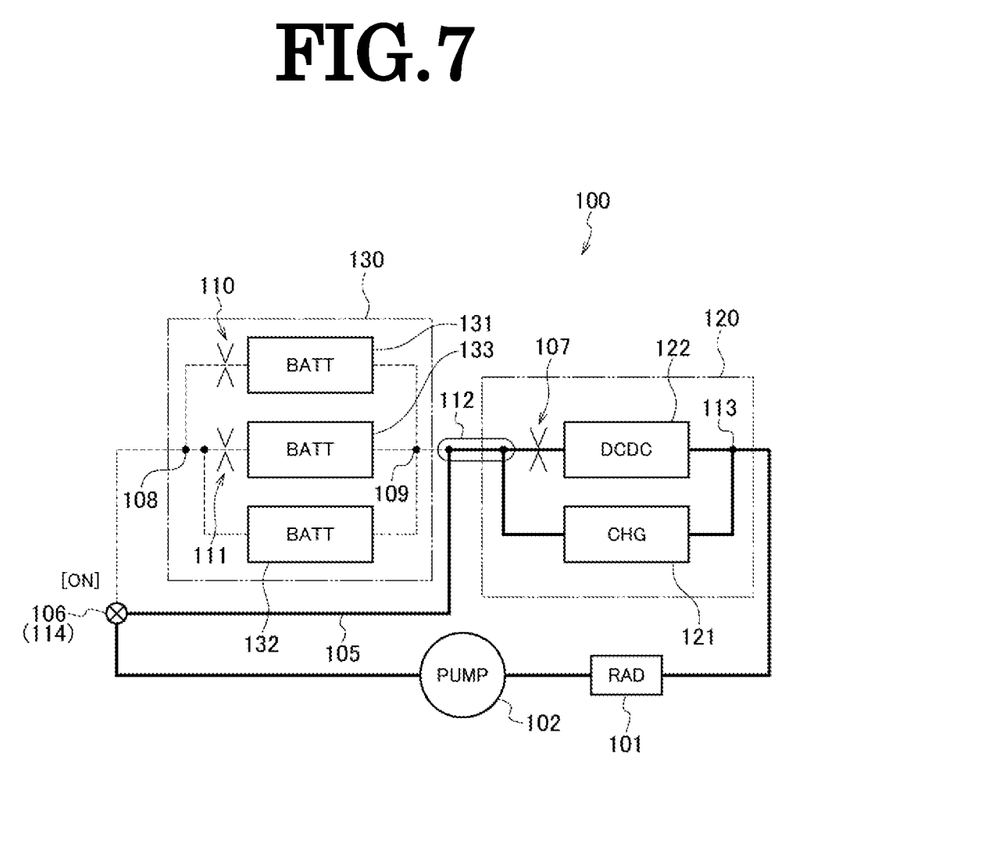
FIG. 7 is a schematic block diagram showing a flow of the refrigerant when the three-way solenoid valve is on in the cooling circuit shown in FIG. 5.

Next, the operation of the cooling circuit 100 will be described by reference to FIGS. 6 and 7. In FIGS. 6 and 7, the flow paths through which refrigerant flows are indicated by solid lines, whereas the flow paths through which no refrigerant flows are indicated by broken lines.

<Three-Way Solenoid Valve [OFF]>

In the cooling circuit 100 configured in the way described above, when the cooling pump 102 is driven, the cooling pump 102 sucks in refrigerant whose temperature is low from the radiator 101 and discharges the refrigerant so sucked towards the high-voltage battery cooling unit 130. In a normal state, since the three-way solenoid valve 106 is off, as shown in FIG. 6, the refrigerant discharged from the cooling pump 102 does not flow into the bypass flow path 105 but is all supplied to the high-voltage battery cooling unit 130.

The refrigerant which is supplied to the high-voltage battery cooling unit 130 is at first divided to the front battery module cooling unit 131 and the rear battery module cooling units 132, 133 at the branching portion 108. As this occurs, the flow rate of refrigerant flowing towards the front battery module cooling unit 131 is restricted at the orifice 110, so that a greater amount of refrigerant than the amount of refrigerant supplied to the front battery module cooling unit 131 is supplied to the rear battery module cooling units 132, 133. The refrigerant supplied to the rear battery module cooling units 132, 133 is divided further to the lower rear battery module cooling unit 132 and the upper rear battery module cooling unit 133. As this occurs, the flow rate of refrigerant supplied towards the upper rear battery module cooling unit 133 is restricted at the orifice 111, so that a greater amount of refrigerant than an amount of refrigerant that is to be supplied to the upper rear battery module cooling unit 133 is supplied to the lower rear battery module cooling unit 132.

The flows of refrigerant which pass through the three battery module cooling units 131 to 133 merge together at the merging portion 109, whereafter the refrigerant is divided to the DC-DC converter cooling unit 122 and the charger cooling unit 121 by way of the branching portion 112. As this occurs, the flow rate of refrigerant supplied to the DC-DC converter cooling unit 122 is restricted by the orifice 107, so that a greater amount of refrigerant than the amount of the refrigerant supplied to the DC-DC converter cooling unit 122 is supplied to the charger cooling unit 121. Then, the flows of refrigerant which pass through the DC-DC converter cooling unit 122 and the charger cooling unit 121 merge together at the merging portion 113, whereafter the refrigerant returns to the radiator 101 where the refrigerant is cooled.

<Three-Way Solenoid Valve [ON]>

In the cooling circuit 100, in the event that the high-voltage batteries 31a to 33a do not have to be cooled, or in the event that the DC-DC converter 22 and the charger 21 need to be cooled although the temperature of the refrigerant is not suited to the temperature requirement of the high-voltage batteries 31a to 33a, the three-way solenoid valve 106 is controlled to be on, whereby as shown in FIG. 7, the supply of refrigerant to the high-voltage battery cooling unit 130 is cut off, so that only the DC-DC converter 22 and the charger 21 can be cooled. Namely, when the three-way solenoid valve 106 is on, the refrigerant discharged from the cooling pump 102 does not flow to the high-voltage battery cooling unit 130 but is all supplied into the bypass flow path 105. The refrigerant supplied to the bypass flow path 105 bypasses the high-voltage battery cooling unit 130 to be divided to the DC-DC converter cooling unit 122 and the charger cooling unit 121 by way of the branching portion 112. As this occurs, the flow rate of refrigerant supplied to the DC-DC converter cooling unit 122 is restricted by the orifice 107, so that a greater amount of refrigerant than the amount of the refrigerant supplied to the DC-DC converter cooling unit 122 is supplied to the charger cooling unit 121. Then, the flows of refrigerant which pass through the DC-DC converter cooling unit 122 and the charger cooling unit 121 merge together at the merging portion 113, whereafter the refrigerant returns to the radiator 101 where the refrigerant is cooled.

Thus, as has been described heretofore, according to the vehicle power supply system 1 of this embodiment, since the high-voltage battery cooling unit 130 is disposed on the upstream side of the high-voltage system equipment cooling unit 120 in the cooling circuit 100, even in such a situation that both the high-voltage batteries 31a to 33a and the high-voltage system equipment need to be cooled, the high-voltage batteries 31a to 33a whose control temperature is lower (or which are less heat-resistant) can be cooled in an ensured fashion without being influenced by the temperature of the high-voltage system equipment. In addition, since the plurality of battery module cooling units 131 to 133 which make up the high-voltage battery cooling unit 130 are connected in parallel, it is possible to reduce the difference in temperature between the battery module positioned on the upstream side and the battery module positioned on the downstream side. Further, since the increase in pressure loss can be suppressed, a small and light cooling pump can be used.

Additionally, the high-voltage system equipment has the DC-DC converter 22 and the charger 21, the high-voltage system equipment cooling unit 120 has the DC-DC converter cooling unit 122 for cooling the DC-DC converter 22 and the charger cooling unit 121 for cooling the charger 21, and the DC-DC converter cooling unit 122 and the charger cooling unit 121 are disposed in parallel in the cooling circuit 100. Therefore, when compared with a case where the DC-DC converter cooling unit 122 and the charger cooling unit 121 are disposed in series, the pressure loss can be reduced. In addition, even in the event that the DC-DC converter cooling unit 122 and the charger cooling unit 121 have different refrigerant flow rate requirements, since their refrigerant flow rate requirements can be supplied to the DC-DC converter cooling unit 122 and the charger cooling unit 121, respectively, without any waste, the increase in delivery capacity that the cooling pump 102 should provide can be suppressed.

Since the cooling circuit 100 has the orifice 107 upstream or on a downstream side of the DC-DC converter cooling unit 122, the flow rate of refrigerant supplied to the DC-DC converter cooling unit 122 can be controlled highly accurately, and the remaining refrigerant is all supplied to the charger cooling unit 121 having the greater refrigerant flow rate requirement, whereby the charger 21 can be cooled in an ensured fashion.

Additionally, since the cooling circuit 100 has the bypass flow path 105 which bypasses the high-voltage battery cooling unit 130 and the three-way solenoid valve 106 which is the solenoid valve functioning as a flow path selector which switches the flow paths, the supply of refrigerant to the high-voltage battery cooling unit 130 can selectively be cut off using the simple circuit configuration. In addition, the temperatures of the high-voltage batteries 31a to 33a can be controlled appropriately based on the flow path selecting control corresponding to the request from the batteries 31a to 33a.

Since the three-way solenoid valve 106 is provided at the branching portion 114 where the bypass flow path 105 branches off from the flow path situated on the upstream side of the high-voltage battery cooling unit 130, it is possible to switch between the state where a whole amount of refrigerant is supplied to the high-voltage battery cooling unit 130 and the high-voltage system equipment cooling unit 120 (the DC-DC converter cooling unit 122 and the charger cooling unit 121) and the state where all the refrigerant is supplied only to the high-voltage system equipment cooling unit 120 by switching the three-way solenoid valve 106 as required.

The invention is not limited to the embodiment that has been described heretofore and hence can be modified or improved as required.

For example, in the embodiment described above, the high-voltage battery cooling unit 130 is described as being made up of the three battery module cooling units 131 to 133 so as to correspond individually to the three battery modules 31 to 33. However, the invention is not limited thereto, and hence, two or more battery module cooling units should be connected in parallel.

In the embodiment, while the DC-DC converter 22 and the charger 21 are described as making up the high-voltage system equipment, the high-voltage system equipment may be made up of either of them or may be other high-voltage system equipment such as an inverter. Alternatively, the high-voltage system equipment may include a plurality of DC-DC converters, chargers or inverters.

In addition, the DC-DC converter cooling unit 122 and the charger cooling unit 121 may be connected in series as long as they are provided on the downstream side of the high-voltage battery cooling unit 130.

Further, the cooling circuit 100 described in the embodiment above may be a water-cooled cooling circuit which utilizes water as a refrigerant or an oil-cooled cooling circuit which utilizes oil as a refrigerant.

This patent application is based on Japanese Patent Application (No. 2015-030680) filed on Feb. 19, 2015, the contents of which are incorporated herein by reference.

DESCRIPTION OF REFERENCE NUMERALS

1 Vehicle power supply system
21 Charger (High-voltage system equipment)
22 DC-DC converter (high-voltage system equipment)

31a to 33a High-voltage battery (Battery)
31 to 33 Battery module
100 Cooling circuit
101 Radiator
102 Cooling pump
103f Sixth external piping (Flow path on an upstream side of high-voltage battery cooling unit)
105 Bypass flow path
106 Three-way solenoid valve (flow path selector)
107 Orifice (Flow rate control device)
108 Branching portion
109 Merging portion
120 High-voltage system equipment cooling unit
121 Charger cooling unit
122 DC-DC converter cooling unit
130 high-voltage battery cooling unit
131 to 133 Battery module cooling unit

The invention claimed is:

1. A vehicle power supply system comprising:
a plurality of battery modules, each having a plurality of batteries;
a high-voltage system equipment; and
a cooling circuit having a plurality of battery module cooling units for cooling the plurality of battery modules, and a high-voltage system equipment cooling unit for cooling the high-voltage system equipment, wherein:
in the cooling circuit;
each of the plurality of battery module cooling units is disposed in parallel;
each of the plurality of battery module cooling units have different refrigerant flow rate requirements;
a branching portion is provided on an upstream side of the each of the plurality of battery module cooling units disposed in parallel;
a merging portion is provided on a downstream side of the plurality of battery module cooling units;
the high-voltage system equipment cooling unit is provided on a downstream side of the merging portion;
the high-voltage system equipment has a DC-DC converter and a charger;
the high-voltage system equipment cooling unit has a DC-DC converter cooling unit for cooling the DC-DC converter and a charger cooling unit for cooling the charger;
the DC-DC converter cooling unit and the charger cooling unit are disposed in parallel on the downstream side of the merging portion;
a plurality of flow rate control devices are provided between the branching portion and the plurality of battery module cooling units for supplying flow rates according to the different refrigerant flow rate requirements of each of the plurality of battery module cooling units; and
a total number of plurality of flow rate control devices is less than a total number of plurality of battery module cooling units by one.

2. The vehicle power supply system according to claim 1, wherein
the cooling circuit has a flow rate control device which is disposed on an upstream side or on a downstream side of the DC-DC converter cooling unit.

3. The vehicle power supply system according to claim 1, wherein
the cooling circuit has:
a bypass flow path which connects the upstream side of the plurality of battery module cooling units to a portion that is positioned on an upstream side of the high-voltage system equipment cooling unit and that is positioned on the downstream side of the plurality of battery module cooling units; and
a flow path selector which is provided on the upstream side of the plurality of battery module cooling units.

4. The vehicle power supply system according to claim 3, wherein
the flow path selector is a solenoid valve.

5. The vehicle power supply system according to claim 3, wherein
the flow path selector is a three-way solenoid valve which is provided at a branching portion where the bypass flow path branches off from a flow path on the upstream side of the plurality of battery module cooling units.

* * * * *